United States Patent Office 3,567,476
Patented Mar. 2, 1971

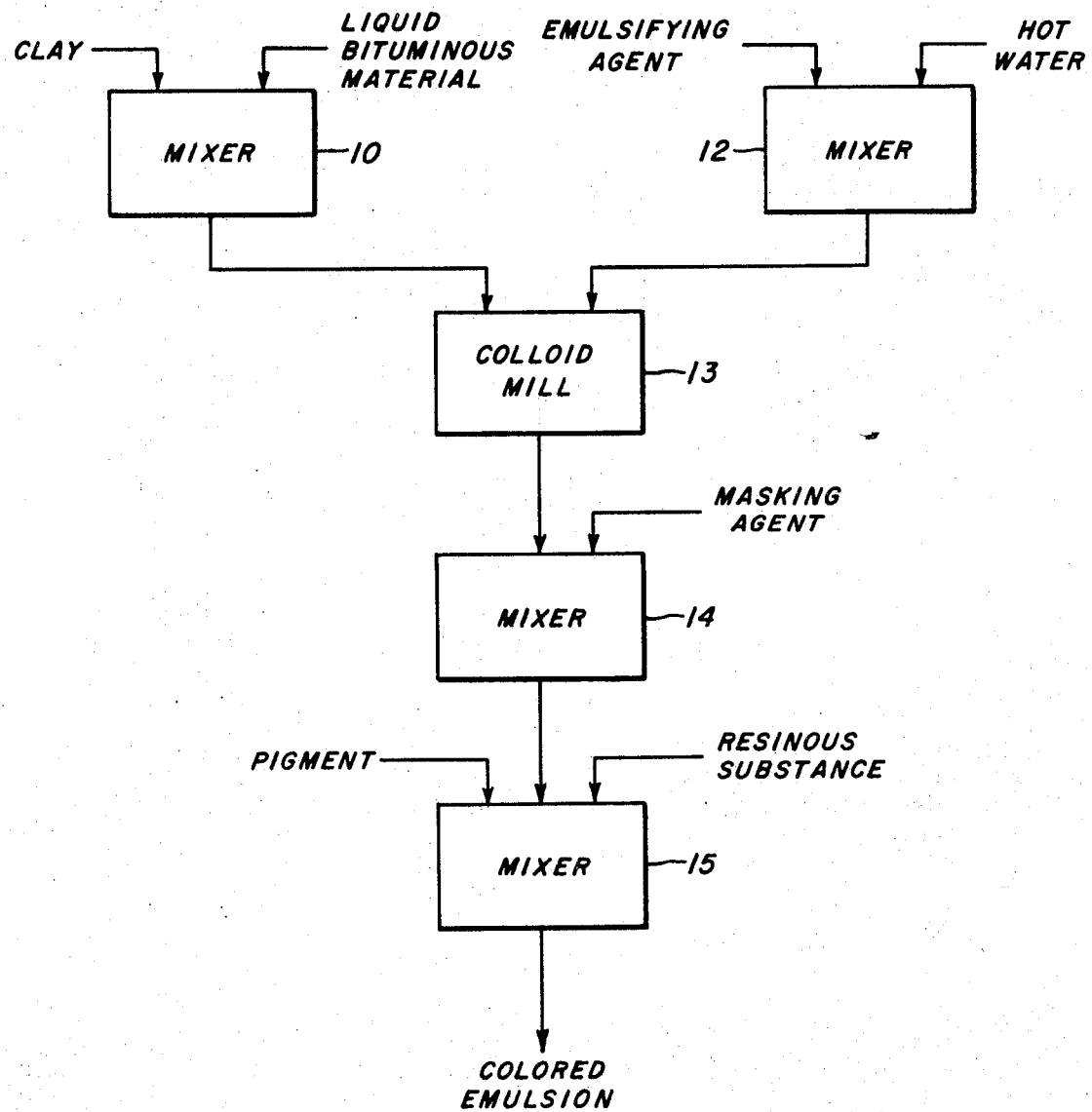

3,567,476
METHOD OF COLORING BITUMINOUS MATERIALS AND THE RESULTING PRODUCT
Philip X. Masciantonio, Penn Township, Westmoreland County, and Richard C. Weil and Myron H. Wilt, Monroeville, Pa., assignors to United States Steel Corporation
Continuation-in-part of application Ser. No. 515,668, Dec. 22, 1965. This application Apr. 4, 1969, Ser. No. 822,807
Int. Cl. C08h *13/00*; C08k *1/62*; C09d *3/24*
U.S. Cl. 106—277                                             5 Claims

ABSTRACT OF THE DISCLOSURE

A method is disclosed for coloring a liquid bituminous material which is normally black. The liquid bituminous material is mixed with a filler (e.g., montmorillonite clay). Separately a protective colloid emulsifying agent is mixed with hot water. The two mixtures are combined in a colloid mill to form a water emulsion of the bituminous material. Next a clay masking agent is mixed with the emulsion. Finally a resinous substance (e.g., latex) and a pigment are mixed with the emulsions. The resinous substance and pigment coat the individual masked colloidal particles of bituminous material.

---

This application is a continuation-in-part of our earlier copending application Ser. No. 515,668, filed Dec. 22, 1965, now abandoned.

This invention relates to an improved method of coloring bituminous materials and to the resulting colored product.

Bituminous materials, such as coal, tar, pitch, and asphalt, characteristically are black. Bituminous materials of other color are desired for some applications, for example in certain protective coatings. Heretofore it has been possible to impart a different color to these materials only by loading them with a high percentage of pigment, usually in excess of 20 percent by weight. Pigment readily rubs off an exposed coating which has a pigment content this high, and discolors anything coming in contact therewith (known as "crocking").

An object of our invention is to provide an improved method of coloring bituminous materials and a resulting colored product in which we use a much smaller content of pigment, in many instances less than 5 percent by weight.

A more specific object is to provide an improved method of coloring bituminous materials in which we form a water emulsion of the material, and incorporate pigment in a way to form stable coatings on individual colloidal particles of the emulsion.

In the drawing:

The single figure is a schematic flow sheet of a typical way of practicing the method of our invention.

As a starting material, we may use any of a number of bituminous materials which liquefy at temperatures of liquid water. Most commonly we use coal, tar, pitch, or asphalt, either a natural product or a petroleum residue. We mix an inert filler with the liquefied bituminous material to form a dispersion which contains about 5 to 25 percent by weight of filler. Our preferred filler is a montmorillonite clay, such as that available commercially as "ASP-400," but we can use other substances, including other clays (such as attapulgite or kaolin), alumina, silica, asbestos, talc, magnesia, lime, barium oxide, pulversized slag, or sawdust. Preferably the filler is minus 100 mesh material, or more preferably minus 200 mesh. Separately we mix an emulsifying agent with hot water (80 to 100° C.) to form a slurry which contains about 5 to 15 percent by weight of emulsifying agent. Our preferred emulsifying agent is bentonite, but we can use other protective colloids, including other clays, methyl cellulose or colloidal silica. The flow sheet shows conventional mixers 10 and 12 for performing the respective mixing steps. Next we introduce the dispersion and slurry to a conventional colloid mill 13 in proportions such that the combined product contains about 30 to 70 percent by weight of water. If the bituminous material melts at a temperature higher than the usual boiling point of water (100° C.), we can maintain an elevated pressure in the colloid mill. The product from the colloid mill is a water emulsion of the bituminous material and remains black.

Next we mix a masking agent with the emulsion in proportions to include about 1 to 10 percent by weight of masking agent. Our preferred masking agent is a montmorillonite clay, but we can use other clays, such as bentonite. The masking agent coats individual colloidal particles of bituminous material, and the color becomes gray. Next we mix a coloring material and a resinous substance (hereinafter described) with the gray emulsion in proportions to include 1 to 5 percent by weight of coloring material and 2 to 10 percent by weight of resinous substance. We can use any of a wide choice of coloring materials, including phthalocyanine dyes, vat dyes, phthalocyanine pigments, sulfur dyes, or metal pigments, such as $Cr_2O_3$, $TiO_2$, $Fe_2O_3$, $Fe_3O_4$, CdS or ZnO.

Examples of suitable resinous substances to be mixed with the gray emulsion are natural or synthetic rubber latex, vinyl polymer latices, acrylic polymer latices, and natural gums, such as shellac. A specific natural rubber latex which we can use in the milky sap from the Hevea Brasiliensis rubber tree containing about 35 percent by weight natural rubber solids and the balance essentially water. Specific synthetic rubber latices which we can use are (a) styrene-butadiene latex prepared by copolymerizing 3 parts by weight butadiene with 1 part of styrene in 10 parts of water; (b) butadiene-acrylonitrile latex prepared by copolymerizing 4 parts by weight butadiene with 1 part of acrylonitrile in 10 parts of water; and (c) chloroprene latex prepared by polymerizing 5 parts by weight 1,4-dichlorobutadiene-1,3 in 10 parts of water. Reference can be made to a printed publication, Kirk-Othmer, "Encyclopedia of Chemical Technology," copyright 1953, volume 11, page 829 et seq for more details on the preparation of suitable synthetic rubber latices. Specific vinyl polymer latices which we can use are (a) 35 parts by weight polyvinyl chloride having a molecular weight of about 50,000 in 65 parts water; or (b) 35 parts by weight polyvinyl acetate having a molecular weight of about 25,000 in 65 parts water. Reference can be made to a printed publication Golding "Polymers and Resins," copyright 1959, pages 409 to 425 for more details on the preparation of suitable vinyl polymer latices. A specific acrylic polymer latex which we can use is polyethyl acrylate prepared by polymerizing 30 parts by weight ethyl acrylate in 70 parts of water. Reference can be made to a printed publication, Kirk-Othmer, "Encyclopedia of Chemical Technology," copyright 1963, volume 1, page 307 for more details on the preparation of suitable acrylic polymer latices. Some commercially available substances, which we can use as pigments, already incorporate a suitable resinous substance. The stability of our bituminous emulsion depends on an uncharged protective colloid; hence the ionic character of the latex is immaterial as long as we do not attempt to use a mixture of latices which have opposite charges.

The coloring material coats the masked colloidal particles, while the resinous substance acts as a stabilizer. The flow sheet shows two conventional mixers 14 and 15 for performing the last two mixing steps, although both can be performed in sequence in the same mixer. The product of the final mixing step is a colored emulsion of the bituminous material. It can be used the same way that black bituminous emulsions are used. Examples of its use are in protective coatings for asphalt and coal tar pavements, wood, metal or masonry, adhesive or binding agents, joint sealers, paper and wood composites, and roofing materials. The water evaporates after the emulsion is applied, leaving a bituminous material of any selected color. It is critical to the successful practice of our invention that we perform the various steps in the sequence named.

Specific examples to show how we may prepare compositions according to our invention are as follows.

EXAMPLE 1

We dispersed 9 parts by weight of montmorillonite clay ("ASP–400") in 91 parts of hot (100° C.) coal tar pitch (38° C. ring and ball softening point). We blended 7 parts by weight of bentonite with 93 parts of hot (80° C.) water to form a slurry. We introduced 54 parts by weight of the bentonite slurry and 46 parts of the pitch dispersion to a colloid mill to produce a pitch emulsion. We introduced 94 parts by weight of the emulsion and 6 parts of "ASP–400" to a mixer. After thoroughly mixing the materials, we added 2 parts of blue pigment and 8 parts of polyvinyl acetate latex. The trade designation of the pigment as listed in "Trade Designation Manual," published by National Paint, Varnish and Lacquer Association, Inc., was Ultramarine Blue UB 8058, and the Federal Specification TT–C–610. The polyvinyl acetate latex had properties as follows:

Viscosity—1200–1800 cps. at 25° C.
pH—2.7–3.3
Nonvolatiles—45–55% by weight
Molecular weight—20,000

By following this procedure, we produced a blue-colored pitch emulsion.

EXAMPLE 2

We dispersed 15 parts by weight of "ASP–400" in 85 parts of hot (100° C.) coal tar pitch (44° C., R and B softening point). We blended 5 parts by weight of bentonite with 95 parts of hot (80° C.) water to form a slurry. We introduced 58 parts by weight of the bentonite slurry and 42 parts of the pitch dispersion to a colloid mill to produce a pitch emulsion. We introduced 94 parts by weight of the emulsion and 6 parts of "ASP–400" to a mixer. After thoroughly mixing the materials, we added red pigment and latex in the form of a water-base enamel which contained about 9 percent by weight pigment and 23 percent synthetic latex solids. The trade designation of the pigment as listed in the first publication cited in Example 1 was Para Red Toner Dark RC 1290. The latex was butadiene-acrylonitrile latex prepared by copolymerizing 4 parts by weight butadiene with 1 part of acrylonitrile in 10 parts of water. By following this procedure we obtained a red-colored pitch emulsion.

EXAMPLE 3

Following the procedure described in Examples 1 and 2, we made a red-colored pitch emulsion, which we applied as a coating to a substrate of asphalt pavement. After evaporation of the water, the coating had the following composition in parts by weight:

64 parts pitch (38° C. R and B softening point)
21 parts ASP–400
5 parts bentonite
2 parts red pigment
8 parts polyvinyl acetate latex We used the same red pigment as in Example 2 and the same latex as in Example 1. The coating was smooth and adherent, and the coated product had an attractive appearance.

EXAMPLE 4

Following the procedure described in Examples 1 and 2, we made a green-colored pitch emulsion which we applied as a coating to substrates of wood and asphalt pavement. After evaporation of the water, the coating had the following composition in parts by weight:

58 parts pitch (44° C. R and B softening point)
20 parts ASP–400 mineral filler
4 parts silica and silicates
4 parts bentonite
3 parts chromic oxide green
3 parts barytes
8 parts synthetic polymer latex solids The trade designation of the pigment as listed in the first publication cited in Example 1 was Chromic Oxide Microfast Medium Dark 11235, and the Federal Specification TT–C–306. The latex was a butadiene-acrylonitrile copolymer prepared as in Example 2. Again the coating was smooth and adherent and had an attractive appearance.

EXAMPLE 5

Following the procedure described in Examples 1 and 2, we made a green-colored asphalt emulsion having the following composition in parts by weight:

30 parts asphalt (200–300 penetration)
55 parts water
3 parts bentonite
1.5 parts barytes
5 parts ASP–400
1.5 parts chromic oxide green
4 parts synthetic polymer latex solids The pigment and the latex were the same as described in Example 4.

From the foregoing description it is seen that our invention affords a simple effective method for coloring otherwise black bituminous materials. The colors are stable and require a minimum pigment content. In this manner the invention broadens the possible uses of these materials to applications where different colors are desired.

We claim:
1. A method of coloring liquid bituminous material selected from the group which consists of coal tar pitch and asphalt, said method comprising:
   mixing a filler with the liquid bituminous material to form a dispersion which contains about 5 to 25 percent by weight of filler, the filler being selected from the group which consists of montmorillonite clay, attapulgite clay, kaolin, alumina, silica, asbestos, talc, magnesia, lime, barium oxide, pulversized slag and sawdust;
   separately mixing an emulsifying agent with water at a temperature of 80 to 100° C. to form a slurry which contains about 5 to 15 percent by weight of emulsifying agent, the emulsifying agent being a protective colloid selected from the group which consists of clay, methyl cellulose and colloidal silica;
   mixing said dispersion and said slurry to form a water emulsion of bituminous material which contains about 30 to 70 percent by weight of water;
   mixing a masking agent with said emulsion in proportions to include about 1 to 10 percent by weight of masking agent, the masking agent being selected from the group which consists of bentonite and montmorillonite clay; and
   mixing a resinous substance and a coloring material with said emulsion in proportions to include about

2 to 10 percent by weight of resinous substance and about 1 to 5 percent by weight of coloring material, the resinous substance being selected from the group which consists of natural latex, synthetic latex, and natural gums, the coloring material being selected from the group which consists of dyes and pigments 2. A method as defined in claim 1 in which the filler is montmorillonite clay.

3. A method as defined in claim 1 in which the emulsifying agent is bentonite clay.

4. A method as defined in claim 1 in which said masking agent is montmorillonite clay.

5. The product of the method defined in claim 1.

References Cited

UNITED STATES PATENTS

| | | | |
|---|---|---|---|
| 2,327,882 | 8/1943 | Gabriel et al. | 106—277 |
| 2,332,311 | 10/1943 | Fadden | 106—277 |
| 2,670,332 | 2/1954 | McCoy et al. | 106—277X |
| 3,296,165 | 1/1967 | Kemp | 106—277X |

JULIUS FROME, Primary Examiner

J. B. EVANS, Assistant Examiner

U.S. Cl. X.R

106—280; 260—28, 745, 758, 767